(12) United States Patent
Zhang et al.

(10) Patent No.: US 12,470,378 B2
(45) Date of Patent: Nov. 11, 2025

(54) SECURE CLOUD STORAGE AND RETRIEVAL OF CLIENT-SIDE ENCRYPTED FILES

(71) Applicant: KEYCRYPT LABS PTY LTD, Doncaster (AU)

(72) Inventors: Alan Miao Zhang, Doncaster (AU); David Fernandez, Doncaster (AU); Nathan Linney-Barber, Doncaster (AU)

(73) Assignee: KEYCRYPT LABS PTY LTD, Doncaster (AU)

( * ) Notice: Subject to any disclaimer, the term of this patent is extended or adjusted under 35 U.S.C. 154(b) by 241 days.

(21) Appl. No.: 18/248,809

(22) PCT Filed: Oct. 14, 2021

(86) PCT No.: PCT/IB2021/059434
§ 371 (c)(1),
(2) Date: Apr. 12, 2023

(87) PCT Pub. No.: WO2022/079647
PCT Pub. Date: Apr. 21, 2022

(65) Prior Publication Data
US 2023/0421370 A1    Dec. 28, 2023

(30) Foreign Application Priority Data
Oct. 15, 2020  (AU) ................................ 2020903748

(51) Int. Cl.
*H04L 9/08*    (2006.01)
*G06F 21/62*   (2013.01)
*H04L 9/32*    (2006.01)

(52) U.S. Cl.
CPC ........ *H04L 9/0863* (2013.01); *G06F 21/6227* (2013.01); *H04L 9/0836* (2013.01); *H04L 9/3226* (2013.01)

(58) Field of Classification Search
CPC ... H04L 9/0863; H04L 9/0836; H04L 9/3226; H04L 9/085; H04L 9/0894; G06F 21/6227; G06F 21/6218
See application file for complete search history.

(56) References Cited

U.S. PATENT DOCUMENTS 9,455,968 B1 *  9/2016  Machani ............. H04L 63/0428
9,887,975 B1 *  2/2018  Gifford ............. H04W 12/0431
(Continued)

FOREIGN PATENT DOCUMENTS

CN    107317823 A  * 11/2017
CN    108650269 A  * 10/2018
(Continued)

OTHER PUBLICATIONS

Adebayo Omotosho, "Securing Private Keys in Electronic Health Records Using Session-Based Hierarchical Key Encryption", Journal of Applied Security Research vol. 12, 2017—Issue 4, 17 pages (Year: 2017).*

(Continued)

*Primary Examiner* — Shahriar Zarrineh
(74) *Attorney, Agent, or Firm* — FisherBroyles, LLP; Cara L. Crowley-Weber; Gregory T. Fettig

(57) ABSTRACT

A system and method for secure cloud storage of client-side encrypted data using a hierarchical encryption structure and a hierarchical storage structure to provide hierarchical key management and hierarchical data access.

10 Claims, 12 Drawing Sheets

(56) References Cited

U.S. PATENT DOCUMENTS

| | | | |
|---|---|---|---|
| 11,082,220 B1* | 8/2021 | Saad | H04L 9/0894 |
| 11,115,196 B1* | 9/2021 | Triandopoulos | H04L 63/083 |
| 2005/0228809 A1* | 10/2005 | Asano | H04L 9/0822 |
| 2006/0059179 A1* | 3/2006 | Asano | H04L 9/0869 |
| 2008/0022361 A1* | 1/2008 | Bharadwaj | H04L 9/0836 |
| | | | 726/2 |
| 2008/0075288 A1* | 3/2008 | Kamijoh | H04L 9/0836 |
| | | | 380/278 |
| 2010/0217986 A1* | 8/2010 | Schneider | H04L 9/3242 |
| | | | 380/279 |
| 2012/0210135 A1* | 8/2012 | Panchapakesan | H04W 12/06 |
| | | | 713/168 |
| 2013/0173905 A1* | 7/2013 | Inatomi | H04L 9/0662 |
| | | | 380/278 |
| 2015/0052369 A1* | 2/2015 | Koning | H04L 9/0894 |
| | | | 713/193 |
| 2016/0021101 A1* | 1/2016 | Balc'H | H04L 63/083 |
| | | | 713/171 |
| 2016/0323105 A1* | 11/2016 | Lee | H04L 9/0863 |
| 2017/0228547 A1* | 8/2017 | Smith | H04L 63/0428 |
| 2017/0249467 A1* | 8/2017 | Mueller | G06F 11/1464 |
| 2018/0004930 A1* | 1/2018 | Csinger | H04L 63/0853 |
| 2018/0278414 A1* | 9/2018 | Vaněk | H04L 9/085 |
| 2019/0122001 A1 | 4/2019 | Bradley et al. | |
| 2019/0280863 A1* | 9/2019 | Meyer | H04L 9/50 |
| 2019/0318356 A1* | 10/2019 | Martin | G06F 21/6209 |
| 2019/0342080 A1* | 11/2019 | Vakili | H04L 63/06 |
| 2020/0236145 A1 | 7/2020 | Sharma et al. | |
| 2020/0389306 A1* | 12/2020 | Dolan | H04L 9/3252 |
| 2021/0099295 A1* | 4/2021 | Li | H04L 9/3226 |
| 2021/0111875 A1* | 4/2021 | Le Saint | H04L 9/3263 |

FOREIGN PATENT DOCUMENTS

| | | | | |
|---|---|---|---|---|
| CN | 109587276 A | * | 4/2019 | |
| CN | 118487866 A | * | 8/2024 | |
| CN | 118890181 A | * | 11/2024 | |
| JP | 4078802 B2 | * | 4/2008 | G06F 21/10 |
| JP | 2019-531010 | | 10/2019 | |
| KR | 20160128170 A | * | 11/2016 | |
| KR | 10-2018-0043676 | | 4/2018 | |
| KR | 10-2018-0131056 | | 12/2018 | |
| TW | 202145757 A | * | 12/2021 | |
| WO | WO-2014158197 A1 | * | 10/2014 | G06F 21/6227 |

OTHER PUBLICATIONS

International Search Report and Written Opinion dated Jan. 13, 2022 from International Application No. PCT/IB2021/059434.

* cited by examiner

SECURE CLOUD STORAGE AND RETRIEVAL OF CLIENT-SIDE ENCRYPTED FILES

RELATED APPLICATIONS

This application is a National Stage Application of PCT/IB2021/059434, filed Oct. 14, 2021, which claims the benefit of Australia Application No. 2020903748, filed Oct. 15, 2020, the disclosures of which are hereby incorporated by reference in their entirety.

FIELD

The present invention relates generally to a system and method for secure cloud storage and retrieval of client-side encrypted data.

BACKGROUND

Online and cloud-based data storage offers high levels of convenience due to the accessibility of the data when compared to physical storage solutions. With the ever-growing digital library of data, finding storage for this information, in an accessible location has become a critical part of the way we interact with the internet. Every website we interact with stores data on the users that visit, and this data can be as low value as the browser name or as personal as credit card information or home address.

For the vast majority of web services data is only encrypted while in transit between the user's machine and the server. This provides an unacceptable level of risk as an attacker can gain access to the storage location and all user information is exposed. This transit level protection is offered as standard through most web services and support for anything less than this level of protection has largely been phased out. Most web browsers will actively turn users away from sites which do not offer protection for data in transit. Service providers usually offer higher levels of security but these are more costly leading many to opt to provide only the bare minimum.

For services wanting better protection for user data, technology such as data-at-rest encryption is often implemented which protects the location data is stored through independent encryption. This protects against the first form of attack discussed where an attacker gains access to the storage location. Data-at-rest encryption ensures all data stored is encrypted and adequately protected making anything scraped from the storage location useless, assuming a high-quality encryption standard was used. For data that is sitting in storage and is rarely accessed this may seem adequate, but data being unprotected at the server level opens up significant risk. This technique is done for convenience sake to allow for data to be highly accessible to the controller when they need it, including for the practice of selling data which is highly profitable. Any data that can be decrypted by the server means there is a risk that the encryption keys used to decrypt data on the server could be exposed compromising everything in the data-at-rest encrypted storage. If an attacker was to get control of the server, they not only have access to any user data that is being processed by the server but also have the ability to unlock everything that is encrypted in cloud storage potentially compromising every user. While this does offer some protection against attacks directed at the storage the data is still at risk.

Usually, systems will take steps to protect the keys used to encrypt the data-at-rest, reducing the likelihood that if an attacker gains access to the server they will also have access to everything sitting in storage. In this instance only data that is directly being processed by the server, often only for a matter of seconds, is at high risk of being compromised while data sitting in the data-at-rest encrypted storage is at a lower risk. While this system does reduce the risk of total breaches of user data it offers no privacy between users and data controllers. Data is only encrypted on the storage system and while on the server it still needs to be in a decrypted state in order to be useful. All data in a data-at-rest encryption system remains highly accessible to the controller meaning employees, contractors or any third party the controller permits can have unrestricted access to all user's data.

Very few applications aim to provide better privacy or security as many usability issues get introduced when trying to shift towards data being encrypted across the whole process. These usability issues cause a lack of desire for service providers to expand the level of protection they offer due to anticipated low acceptance among users and increased complexity in development. Standard processes such as recovering an account due to a forgotten password are not possible without the controller being able to decrypt data, making consumer targeted web-based platforms feel unusable. In a situation where a service is claiming end-to-end encryption or complete data privacy but is also offering the ability to recover data without a password, recovery code or other user-controlled key, the service provider actually has full access to the data at any time. In a system that is truly end-to-end encrypted the service provider should have no options to decrypt stored data without the user providing the key to that data. If the key is lost the data should be unrecoverable. For most systems the data controller keeps a key to every user's data which could be used for any purpose at any time. Just because a service is currently choosing not to release the user's information this could change if: an employee, contractor or supplier goes rogue; the server has been compromised; the service is acquired by another party; or if the service decides to change its business model. These models only provide users a false sense of privacy and give service providers the option to use the data stored on users for any purpose, at any time. The trade-off for true end-to-end or client-side encryption would be that the only way to decrypt user data is with the password or encryption key that the user controls. This removes the ability to recover user data when a user forgets their key and takes away the option for service providers to decrypt user data. This shifts the conversation about privacy away from being about services that choose not to expose user data, towards services that functionally cannot expose user data thereby giving complete power to users.

In order to offer complete digital privacy while leveraging cloud-based services, encryption needs to be offered that covers data in transit, data in storage and data on the server. In order to provide that level of encryption client-side encryption is the best method currently available but the trade-offs in convenience make it unappealing to users. Reducing these usability issues will provide users with a secure, private and convenient cloud-based storage system. The system also needs to function with only standard features offered through the web browser in order to provide the widest range of compatibility, availability, and without relying on user's installing a software package on their device.

As described above, secure cloud storage of client-side encrypted data creates problems of management (key management) of encryption keys.

In view of this background, there is an unmet need for improved solutions for secure cloud storage and retrieval of client-side encrypted data.

SUMMARY

According to the present invention, there is provided a system, comprising:
a memory; and
a processor configured by instructions stored in the memory to:
  receive a password from a user;
  derive an encryption root key and user identity information from the password;
  authenticate the user by an identity provider service using the password-derived user identity information;
  client-side encrypt data of the authenticated user using a hierarchical encryption structure derived from the password-derived encryption root key;
  store the client-side encrypted data in cloud storage in a hierarchical storage structure;
  establish trusted party relationships between the user and trusted parties using out-of-band encryption key exchange;
  split an encryption key into partial encryption keys;
  distribute the partial encryption keys between the trusted parties;
  assemble the partial encryption keys from the trusted parties to allow one or more of:
    the trusted parties to retrieve and decrypt the client-side encrypted data;
    the user to reset the password;
    the user or the trusted parties to perform hierarchical key management of one or more of the encryption root key, the encryption key, and the partial encryption keys.

The encryption root key may be derived from an intermediate root key which is derived from the password within a short time after receiving the password to minimise the time required for storage of the password in memory.

The hierarchical encryption structure of the client-side encrypted data may mirror or map to the hierarchical storage structure of the client-side encrypted data.

The hierarchical encryption structure may comprise a key graph, and the hierarchical storage structure may comprise a file storage structure.

The key graph may comprise a tree having a single root encryption key derived from the password-derived encryption root key, and each path in the tree may comprise a hierarchy of wrapped encryption keys derived from the single root encryption key.

The client-side encrypted data may be stored in a hierarchy of data objects, wherein the hierarchy of wrapped encryption keys mirrors or maps to the hierarchy of data objects in which the client-side encrypted data is stored.

The hierarchical key management of one or more of the encryption root key, the encryption key, and the partial encryption keys may comprise one or more of key generation, key recovery, key reset, key rotation, key exchange, key distribution, key allocation, and key delegation within an organisation.

The hierarchy of wrapped encryption keys may enable hierarchical delegation of encryption keys within an organisation having a hierarchical structure, wherein a superior trusted party within the organisation may generate a hierarchical encryption key of a lower-level recipient within the organisation to thereby allow hierarchical access by the lower-level recipient to the client-side encrypted data.

A predetermined condition for retrieval and decryption of the client-side encrypted files may be specified by the user, and the trusted parties may comprise a subset of:
a claimant to claim that the condition has been satisfied;
an approver to approve or deny the claim; and
a receiver to retrieve and decrypt the client-side encrypted files if the claim is approved.

The present invention further provides a method, comprising:
receiving a password from a user;
deriving an encryption root key and user identity information from the password;
authenticating the user by an identity provider service using the password-derived user identity information;
client-side encrypting files of the authenticated user using a hierarchical encryption structure derived from the password-derived encryption root key;
storing the client-side encrypted files on cloud storage in a hierarchical storage structure;
establishing trusted party relationships between the user and trusted parties using out-of-band encryption key exchange;
splitting an encryption key into partial encryption keys;
distributing the partial encryption keys between the trusted parties;
assembling the partial encryption keys from the trusted parties to allow one or more of:
  the trusted parties to retrieve and decrypt the client-side encrypted data; or
  the user to reset the password;
  the user or the trusted parties to perform hierarchical key management of one or more of the encryption root key, the encryption key, and the partial encryption keys.

The present invention also provides a non-transitory machine-readable medium having stored thereon machine-readable instructions executable to cause a machine to perform operations comprising:
receiving a password from a user;
deriving an encryption root key and user identity information from the password;
authenticating the user by an identity provider service using the password-derived user identity information;
client-side encrypting files of the authenticated user using a hierarchical encryption structure derived from the password-derived encryption root key;
storing the client-side encrypted files in cloud storage using a hierarchical storage structure;
establishing trusted party relationships between the user and trusted parties using out-of-band encryption key exchange;
splitting an encryption key into partial encryption keys;
distributing the partial encryption keys between the trusted parties;
assembling the partial encryption keys from the trusted parties to allow one or more of:
  the trusted parties to retrieve and decrypt the client-side encrypted files; or
  the user to reset the password;

the user or the trusted parties to perform hierarchical key management of one or more of the encryption root key, the encryption key, and the partial encryption keys.

BRIEF DESCRIPTION OF DRAWINGS

Embodiments of the invention will now be described by way of example only with reference to the accompanying drawings, in which.

DESCRIPTION OF EMBODIMENTS

Figure 1:
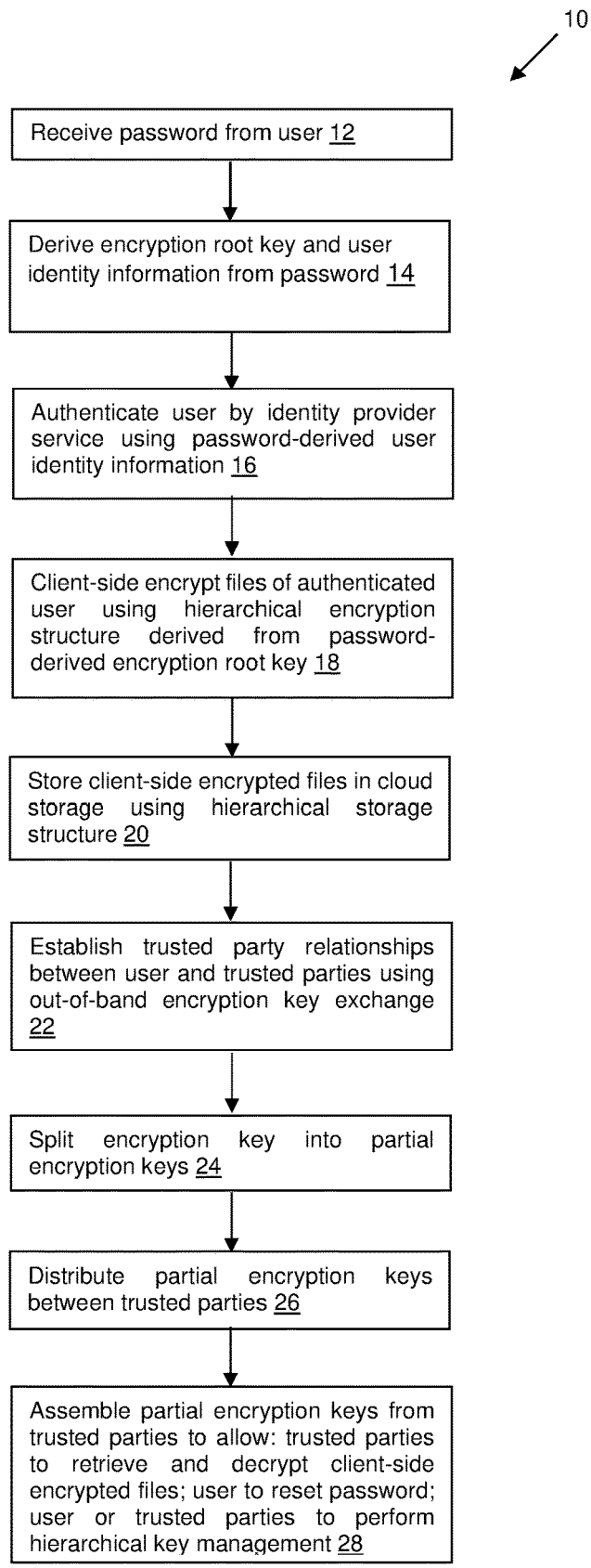
FIG. 1 is a flow diagram of a method for method for secure cloud storage and retrieval of client-side encrypted data according to an embodiment of the present invention.

Referring to FIG. 1, a method 10 for secure cloud storage and retrieval of client-side encrypted data according to an embodiment of the present invention may start at step 12 by receiving a password from a user.

Next, at step 14, an encryption root key and user identity information may be derived from the password. The user may then be authenticated at step 16 by an identity provider service using the password-derived user identity information.

The encryption root key may be derived from an intermediate root key which is derived from the password within a short time after receiving the password to minimise the time required for storage of the password in memory. In other words, an intermediate key, PrePassKey, may be derived from Password as soon as possible and stored securely to ensure Password is held in memory for the shortest time possible. Other keys noted as being derived from Password may then be derived from this intermediate, instead of being directly derived from Password. This intermediate may be derived through cryptographic one-way functions and with enough computational load such that it is not reversible and will take a significant amount of computational load to recover the password via brute force enumeration of possible passwords. For the remainder of this document, wherever "password" is used in the context of deriving other key material, it can be optionally replaced with the "PrePassKey".

Data of the authenticated user may be client-side encrypted at step 18 using a key graph. The key graph may comprise a tree having a single root encryption key derived from the password-derived encryption root key, and each path in the tree may comprise a hierarchy of wrapped encryption keys (or "a key-cascade") derived from the single root encryption key. The client-side encrypted data may then be stored on cloud storage at step 20.

Next, at step 22, trusted party relationships may be established between the user and trusted parties using out-of-band encryption key exchange. Split-encryption keys derived from the password-derived encryption root key may be created at step 24. The split-encryption keys may then be distributed between the trusted parties at step 26.

The method 10 may end at step 28 by assembling the split-encryption keys to allow either the trusted parties to retrieve and decrypt the client-side encrypted data, or the user to reset the password. The user may specify a predetermined condition for retrieval and decryption of the client-side encrypted data, and the trusted parties may comprise a subset of: a claimant to claim that the condition has been satisfied; an approver to approve or deny the claim; and a receiver to retrieve and decrypt the client-side encrypted data if the claim is approved.

Embodiments of the method 10 may be implemented as an encryption service by a system comprising web browsers associated with the user and the trusted parties, and a cloud server and cloud storage associated with the encryption service.

Examples of encryption techniques used in embodiments of the encryption service of the present invention will now be described in more detail with reference to FIGS. 2 to 12 which refer to an encryption service known as "KeyCrypt®" that is provided by the present applicant.

Authentication

One aspect of the security of the encryption service is the separation of the secret material required for authentication (or confirmation of identity), and the secret material required for cryptographic protection (or encryption/decryption of the user's data). This is advantageous where the encryption service uses a third-party Identity Provider for authentication. It is desirable that a breach of the Identity provider, which is not under the direct control of the encryption service, cannot result in a breach of user data.

Figure 2:
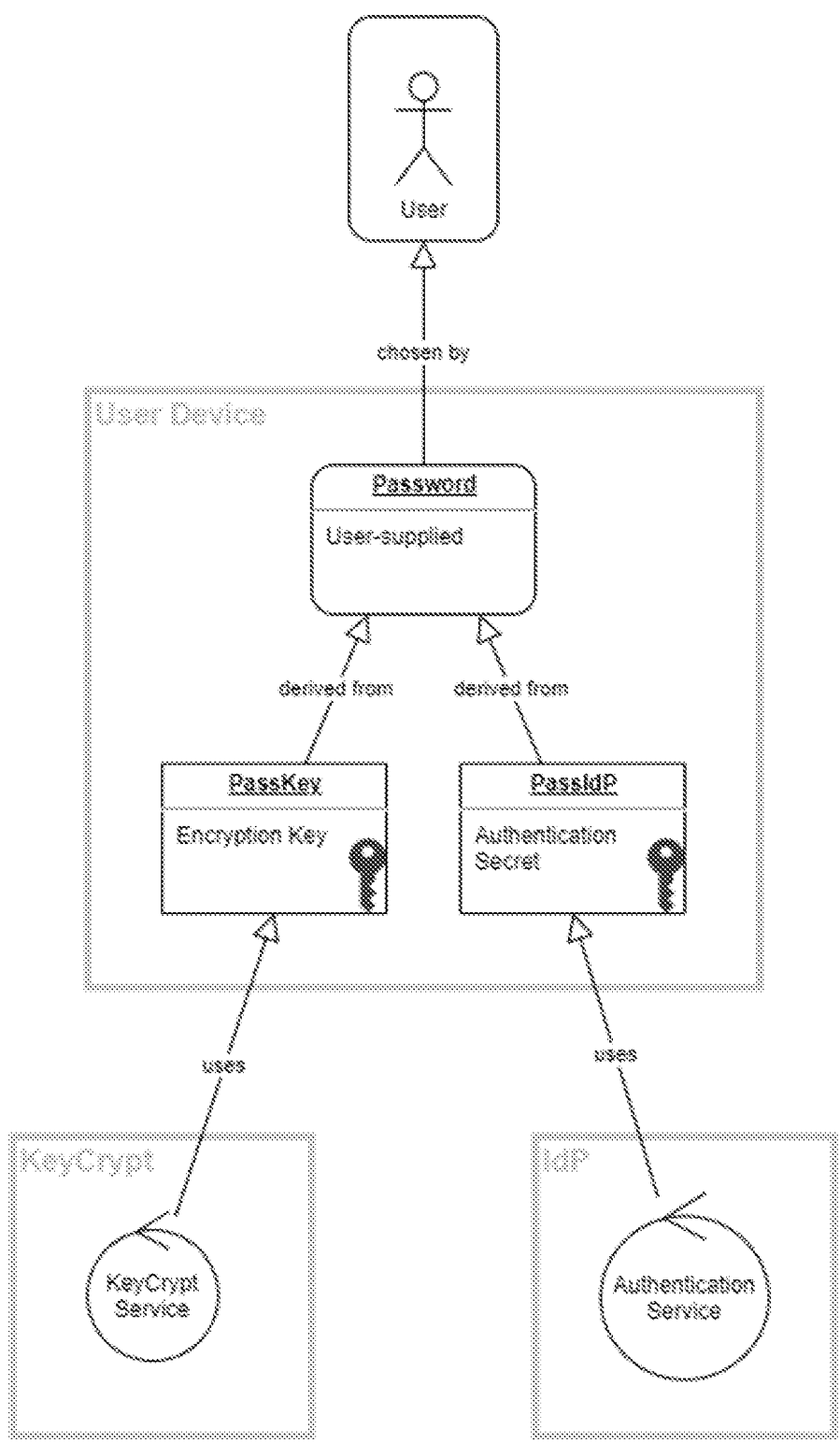
FIG. 2 is a schematic diagram of an authentication process of the method.

To achieve this, embodiments of the encryption service may use a three-part security approach as illustrated in FIG. 2. This may comprise a user-chosen Password, a derived PassKey, and a derived PassIdP. The PassKey may be one-way derived from the Password, and is used only by the encryption service for cryptographic access (or encryption and decryption) to User data. The PassIdP may also independently be one-way derived from the Password, and may be used only by the Identity Provider for User Authentication.

The Password may never be persistently stored (the User is required to enter it whenever it is needed), and so cannot be revealed by a breach of either the encryption service or the Identity Provider. The independent, one-way derivations of PassKey and PassIdP mean that if either are breached, neither Password nor the other derived component can be recovered. Together, these features mean that there is a strong separation of the base-required secret material.

Registration

Figure 3:
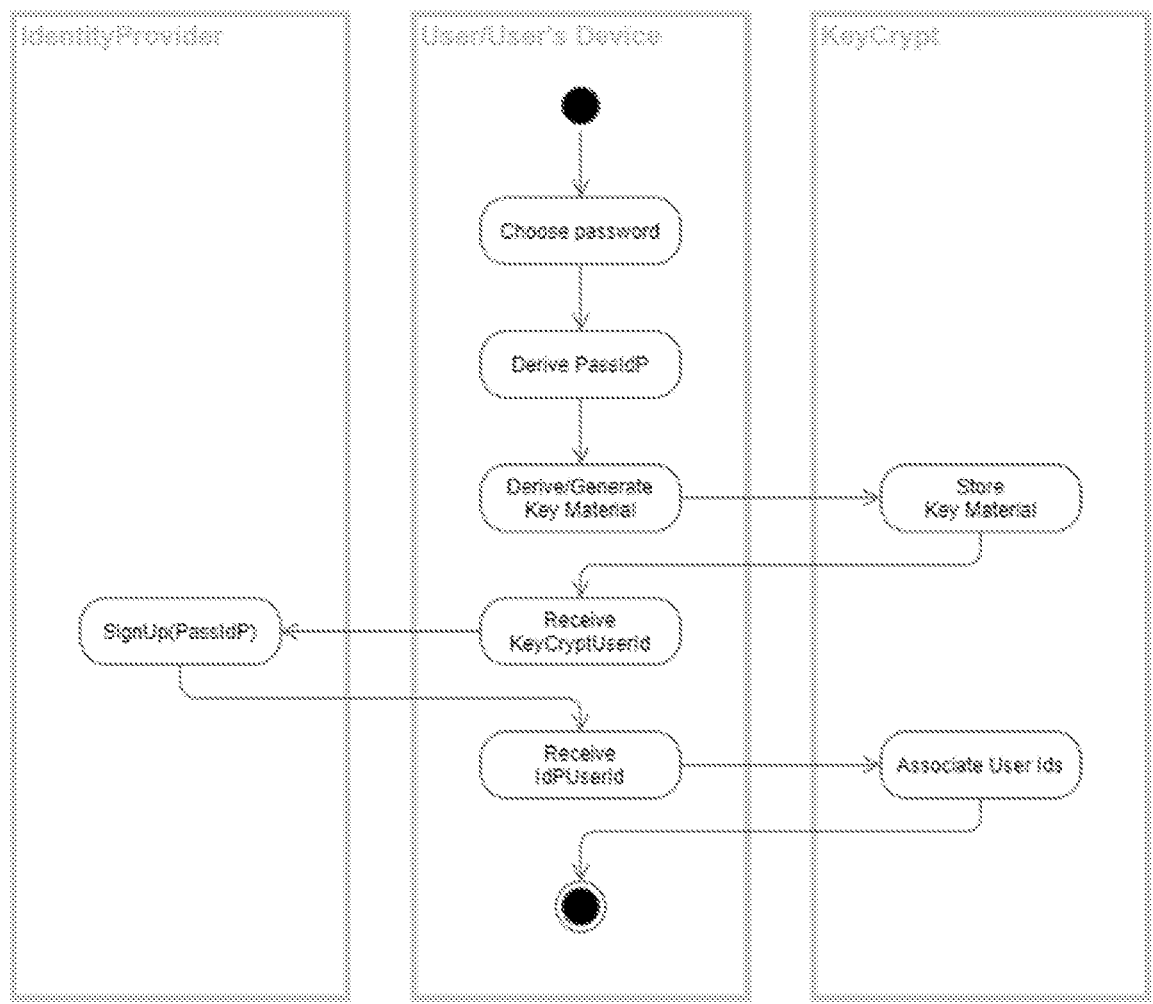
FIG. 3 is a schematic diagram of a registration process of the method.

Referring to FIG. 3, when a new user registers with the encryption service, they may choose a Password. From this, PassIdP is derived, and supporting Key Material may be derived and generated. This Key Material may be stored with the encryption service, and the User may receive a UserId as their unique identifier within the encryption service. Using the derived PassIdP, the User may perform a sign-up operation with the Identity Provider, which returns an IdPUserId as their unique identifier with the Identity Provider. This identifier may be sent to the encryption service, which associates the two identifiers.

Note that the items within the Key Material bundle may either be required to be kept secret, and so may be secured by keys only available to the User (ie, derived from Password), or not required to be kept secret (eg, public keys or salt values), such that the encryption service is not able to access any item required to be kept secret.

Login

Figure 4:
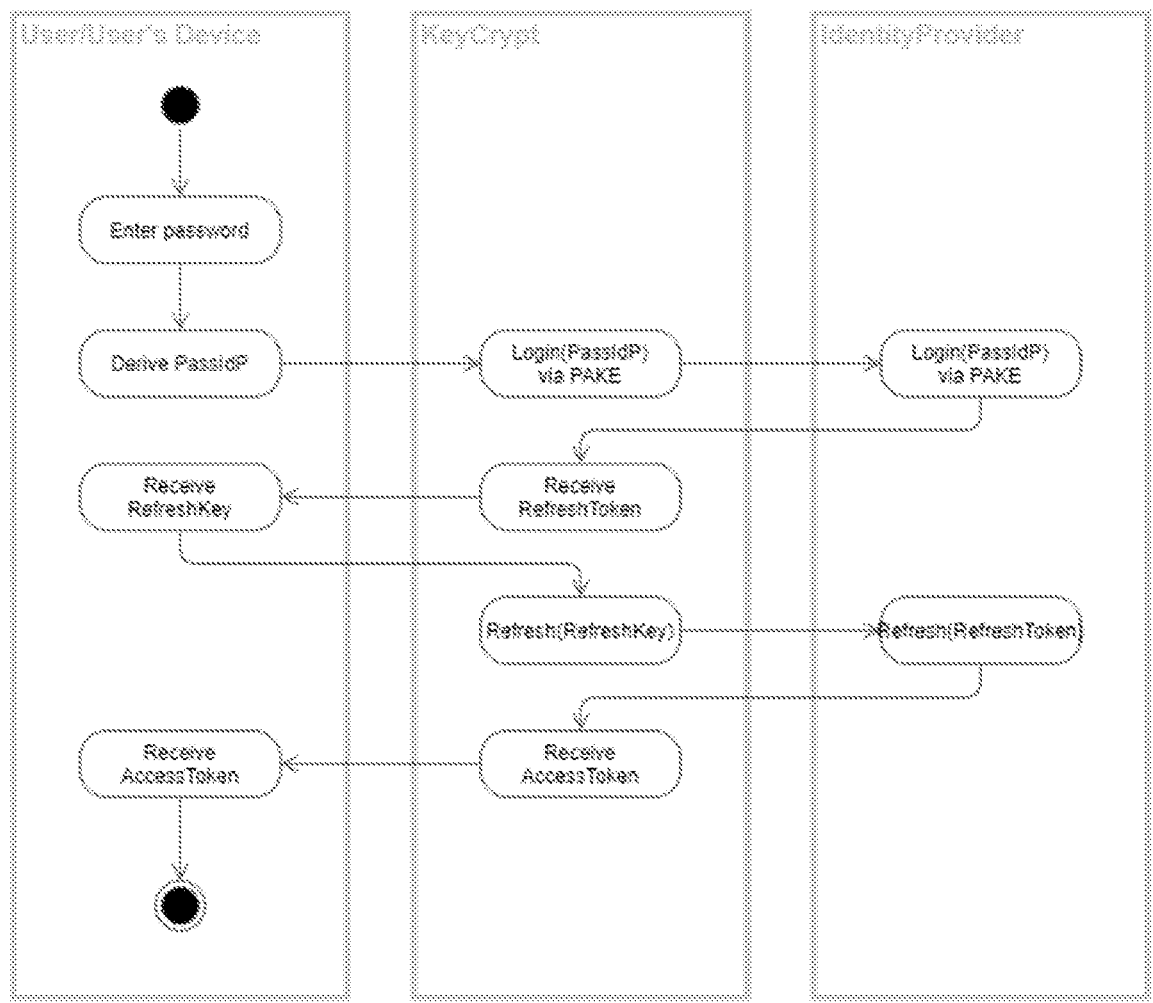
FIG. 4 is a schematic diagram of a login process of the method.

Referring to FIG. 4, during the login process, the encryption service may act as a proxy between the User and the Identity Provider. The User may enter their Password from which PassIdP is derived. This may then be used to authenticate against the Identity Provider, via the encryption service, using PAKE (Password Authenticated Key Exchange), such that PassIdP is neither revealed to the encryption service, nor directly communicated. The encryption service may then receive and store a RefreshToken, and pass on a RefreshKey to the User. The RefreshKey may then be used by the User to request and receive an AccessToken from the Identity Provider via the encryption service. This AccessToken may then be used in future requests to verify the identity of the User.

The RefreshToken may be long-lived and so must be stored both persistently and securely. These requirements may not be adequately met within the constraints of a web browser, hence the use of the encryption service as a proxy where persistent and secure storage is achievable. In addition, using the encryption service as a proxy may allow it to perform additional security functions, such as session invalidation, that may not be feasible were the User to authenticate directly with the Identity Provider.

Key Management

Cryptographic processing (eg, encryption, decryption and signing) of User data or files may be central to the encryption service's approach to information security and so, necessarily, the management of cryptographic keys may be a desirable problem to solve.

Figure 5:
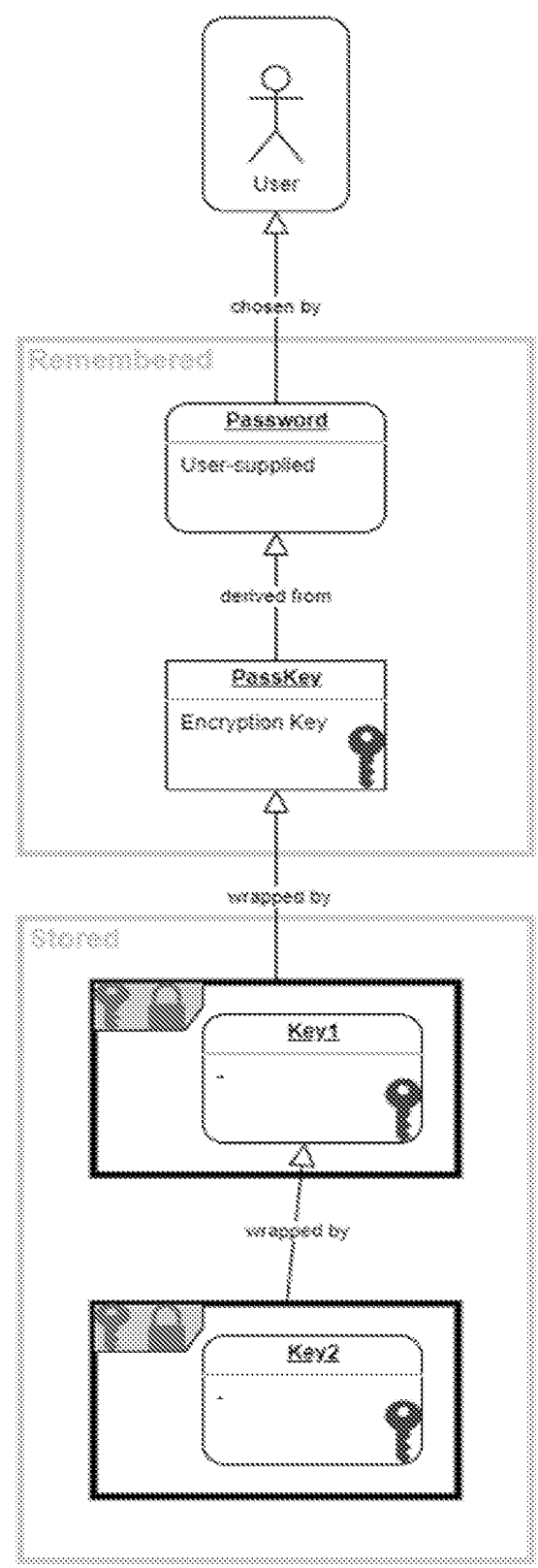
FIGS. 5 and 6 are schematic diagrams of key graphs of the method.

There may be three somewhat competing needs: (1) it is preferable to use many different keys to allow fine-grained control (eg, allowing shared access to an item without allowing access to any others); and (2) keys should not be stored in a manner that would allow even the encryption service to have access to them, but (3) it is preferable for a User to be required to remember as few secrets as possible to minimise the risk of a secret being forgotten or stored insecurely (eg, written down). To resolve this, the encryption service may use a Key Graph that links many keys together semi-hierarchically, as illustrated in FIG. 5.

At the root of the Key Graph may be the singular item that the User is required to remember: their Password. From this, additional key material may be derived (eg, deterministically generate a key), or otherwise unrelated key material (eg, a randomly generated key) may be "wrapped" with one or more existing keys. Wrapping a key is the process of encrypting one key with one or more other keys, such that all the other keys are required in order to access the first. In this manner, it may become safe for the encryption service to store wrapped keys as they are inherently protected. To access any such wrapped item, one must begin with the only item that is not cryptographically protected: the User's remembered Password.

In the example above, the encryption service may only store wrapped versions of Key1 and Key2. To access Key2, for example, the User must first access Key1, which can then be used to unwrap (decrypt) the stored, wrapped (encrypted) version of Key2. To access Key1, the User requires PassKey, which is not stored anywhere, but is derived from their Password, so the User must provide their Password.

Figure 6:
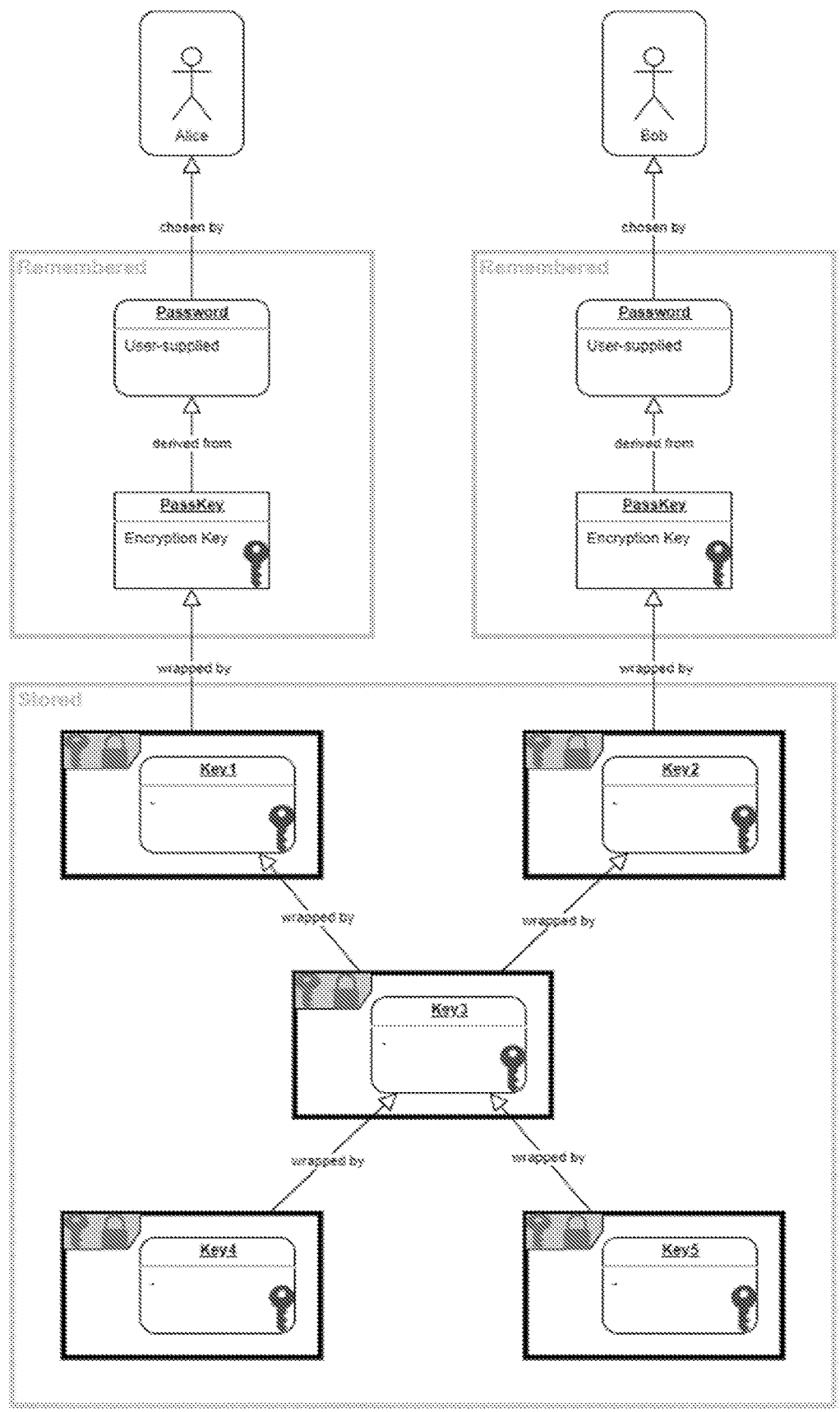

As shown in FIG. 6, it is also possible for a key to be wrapped multiple times, each by a different wrapping key (eg, Key3 is wrapped by both Key1 and Key2), and also for a single key to wrap multiple other keys (eg, both Key4 and Key5 are wrapped by Key3). With these features, it may become possible to provide hierarchical key management or shared cryptographic access with fine-grained access control.

For example, the hierarchical encryption structure of the client-side encrypted data may mirror or map to the hierarchical storage structure of the client-side encrypted data. The hierarchical encryption structure may comprise a key graph, and the hierarchical storage structure may comprise a file storage structure.

The key graph may comprise a tree having a single root encryption key derived from the password-derived encryption root key, and each path in the tree may comprise a hierarchy of wrapped encryption keys derived from the single root encryption key. The client-side encrypted data may be stored in a hierarchy of data objects, wherein the hierarchy of wrapped encryption keys mirrors or maps to the hierarchy of data objects in which the client-side encrypted data is stored.

The hierarchical key management of one or more of the encryption root key, the encryption key, and the partial encryption keys may comprise one or more of key generation, key recovery, key reset, key rotation, key exchange, key distribution, key allocation, and key delegation within an organisation.

For example, the hierarchy of wrapped encryption keys may enable hierarchical delegation of encryption keys within an organisation having a hierarchical structure, wherein a superior trusted party within the organisation may generate a hierarchical encryption key of a lower-level recipient within the organisation to thereby allow hierarchical access by the lower-level recipient to the client-side encrypted data. For example, a manager of the organisation may delegate access to the client-side encrypted data to an employee within the organisation.

Trusted Parties

Within the context of this specification and the encryption service, the term Trusted Party is used to refer to a relationship between two users where trust has been established in order to share data securely. Central to operations between Trusted Parties may be the act of exchanging cryptographic key material such that both parties have access to one or more shared cryptographic keys that are unique to the pair. Once this process is complete, both parties may have the components required to both share data and also verify the authorship of any subsequent changes to the data, both in a cryptographically secure manner.

Key Exchange

The secure exchange of key material in order to establish a trusted party relationship may also require a so-called out-of-band communications channel. Here, out-of-band refers to the fact that the channel is separate from the channel used to communicate between the user and the encryption service. Using a second channel in this way means an attacker would need to compromise both channels to successfully hijack the exchange.

There are two main ways in which an initiating user (referred to as Alice in the diagrams that follow) may perform an exchange of key material with another user or trusted party (Clara), depending on the capabilities of the out-of-band channel being used. These methods are described below.

Low-Bandwidth Key Exchange

Figure 7:
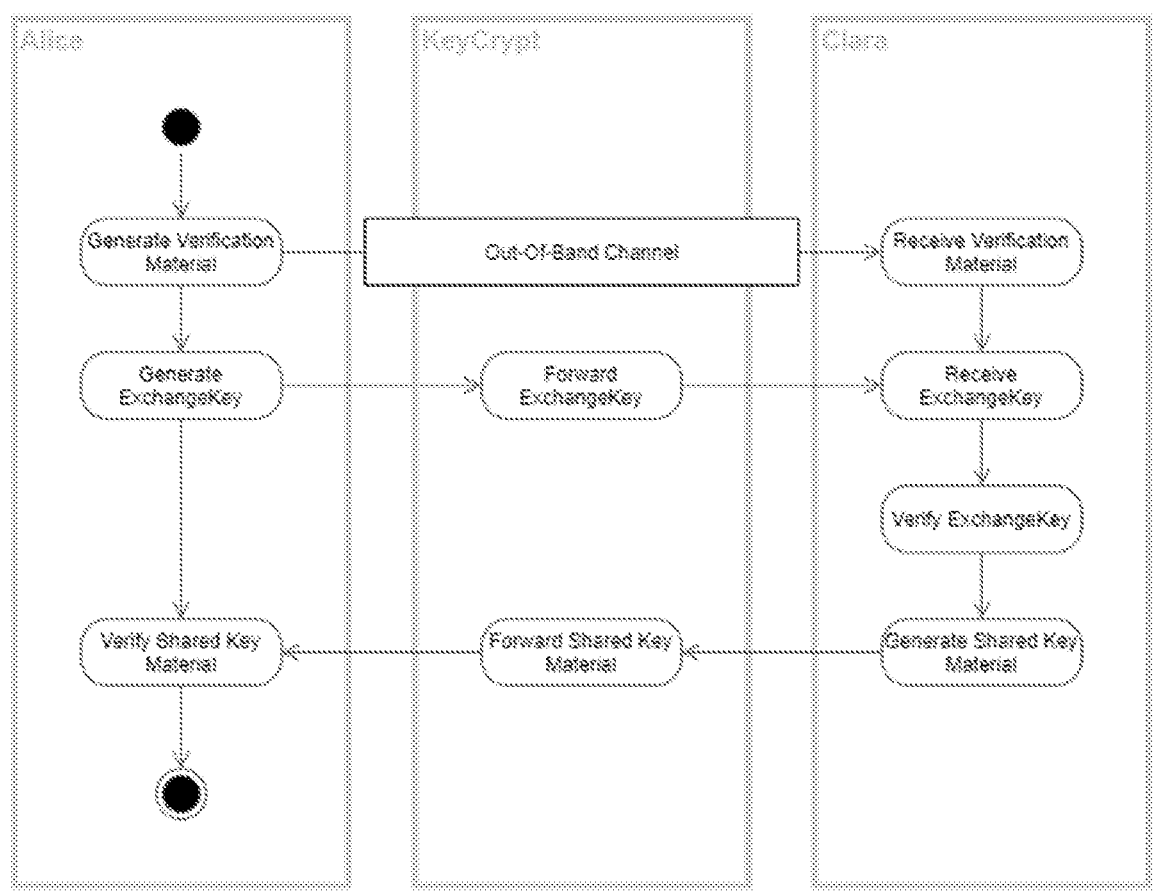
FIG. 7 is a schematic diagram of a low-bandwidth key exchange process of the method.

Referring to FIG. 7, when the out-of-band channel is low bandwidth, such as SMS or voice, the encryption service may use a method that uses the out-of-band channel to transfer a relatively small verifier that is used to verify/confirm the temporary exchange key that is transferred via the primary channel.

The temporary exchange key may be the public component of an asymmetric key pair, and so need not be kept secret. The encryption service may simply require that Clara is able to verify its authenticity—that is, the key does in fact belong to Alice, and has not been substituted or otherwise tampered with by an intermediate attacker, which could include a compromised the encryption service. The out-of-band verifier may allow Clara to confirm that the exchange key she receives via the encryption service does belong to Alice.

Once the exchange key has been verified, Clara may generate long-term shared key material, and send this back to Alice, encrypted with the exchange key. At this point, both Alice and Clara are in possession of securely exchanged shared key material that may be used for subsequent secure communication.

High-Bandwidth Key Exchange

Figure 8:
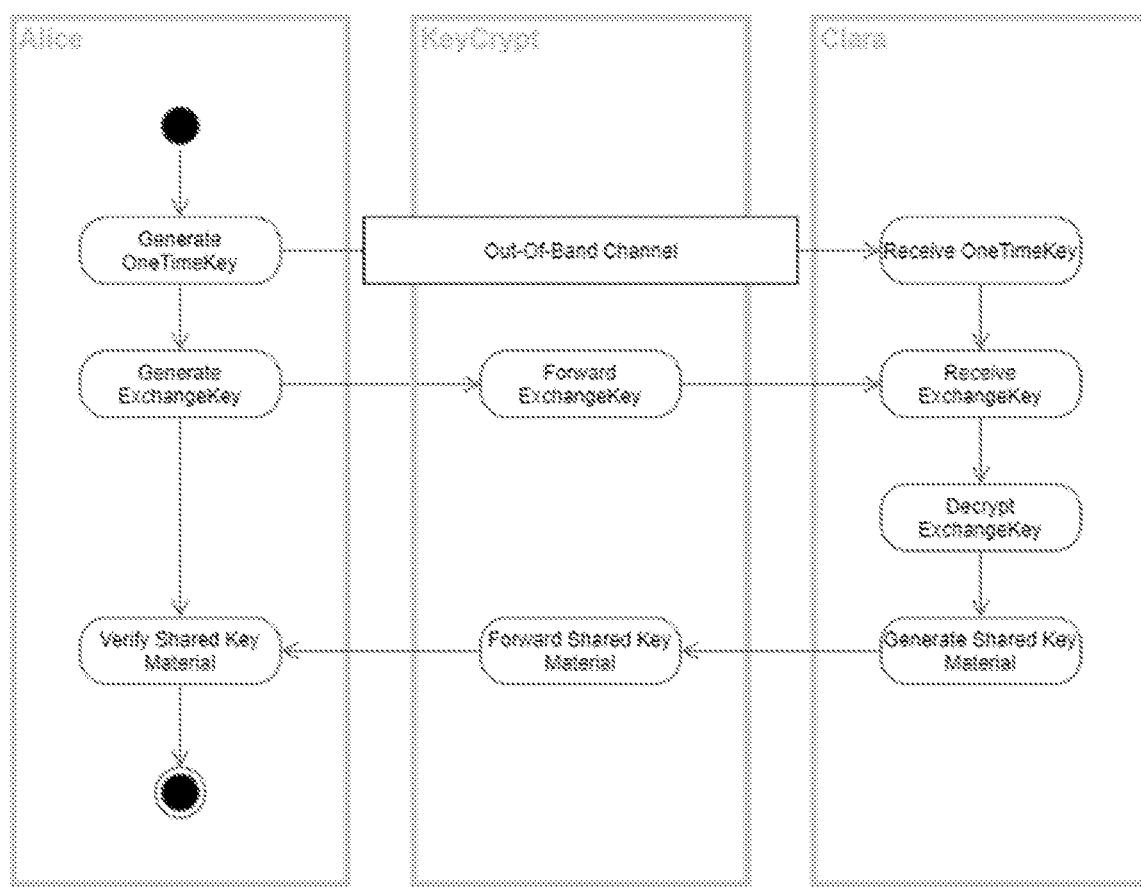
FIG. 8 is a schematic diagram of a high-bandwidth key exchange process of the method.

Referring to FIG. 8, when the channel is high bandwidth, such as e-mail, the encryption service may use a method that uses the out-of-band channel to transfer a relatively large single-use key that is used to decrypt (and verify) the temporary exchange key that is transferred via the primary channel.

As before, the temporary exchange key may be the public component of an asymmetric key pair and again need not be kept secret. However, as it is now possible to communicate a large encryption key out-of-band, the exchange key can be transferred in encrypted form. Clara may now use the out-of-band key to both decrypt and verify the exchange key. Additionally, if required, the encryption service may also transfer other encrypted material (eg, a secure message) along with the exchange key, which was not possible with the low-bandwidth channel that only allowed verification of an unencrypted package.

Again, as before, once the exchange key has been verified, Clara may generate long-term shared key material, and send this back to Alice, encrypted with the exchange key. At this point, both Alice and Clara are in possession of securely exchanged shared key material that may be used for subsequent secure communication.

Password Reset

Figure 9:
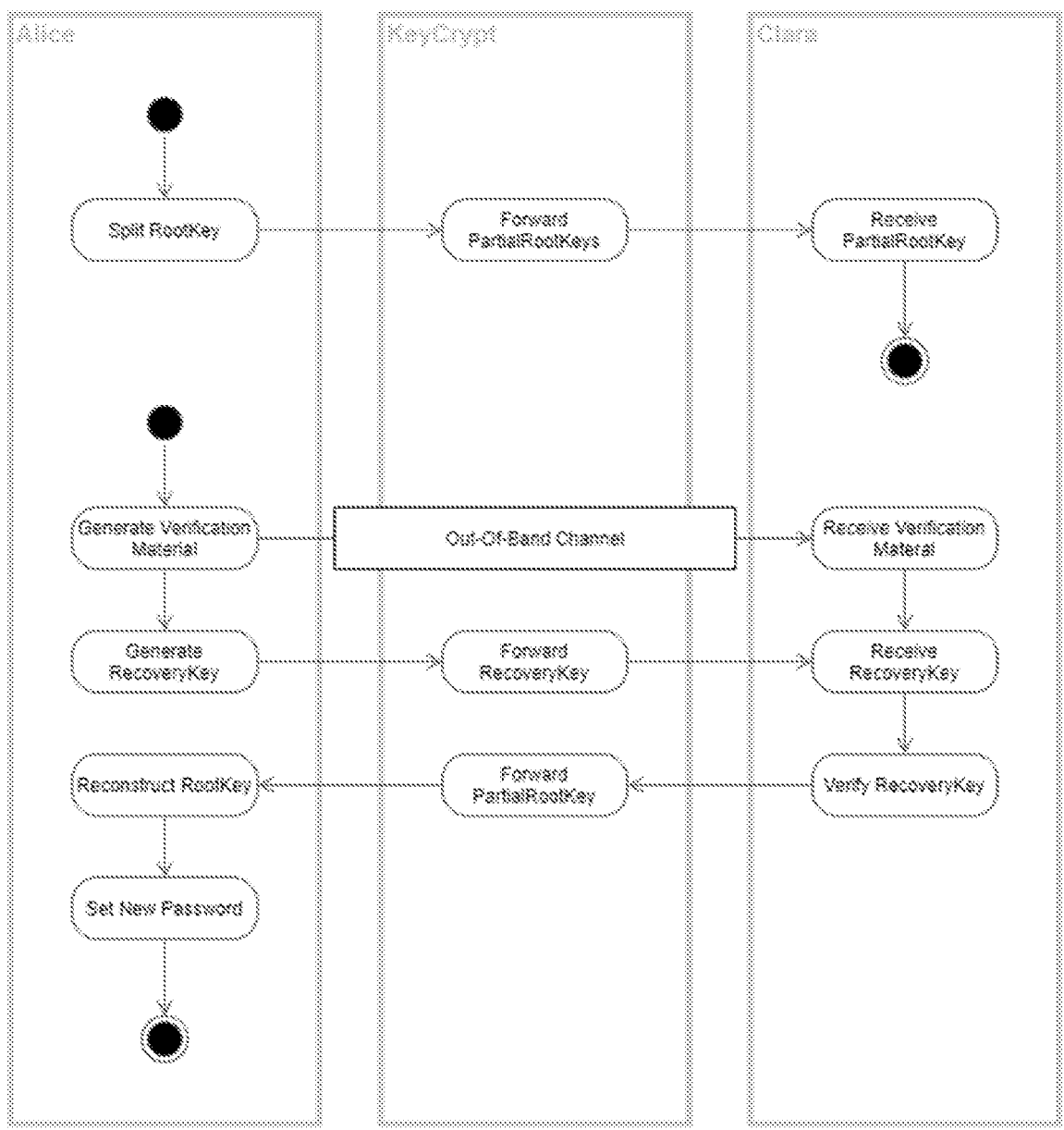
FIG. 9 is a schematic diagram of a password reset process of the method.

A useful feature of a Trusted Party relationship may be the ability for a user (Alice) to safely and securely reset their password in the case that it is forgotten, with the assistance of one or more of her trusted parties. This may use the concept of secret-splitting whereby a secret (eg, an encryption key) is split into multiple parts and can only be recovered/reconstructed when a predetermined number of such partials are combined, as illustrated in FIG. 9.

Strictly speaking, it is not the reset of Alice's password that is being assisted, it is the recovery of her RootKey, which is one of the roots of Alice's cryptographic protection and otherwise can only be accessed if the password is known. However, we refer to this as password reset as that is the context of use.

When setting up assisted password reset, Alice may split her RootKey and send the partial keys to each desired Trusted Party.

The first steps of password reset may be similar to those used to establish the trusted party relationship. Alice may create a means for partial keys to be securely sent to her, and assisting trusted parties may have a way to verify this means.

Alice may generate a temporary key and associated verification material and send these to her recovery parties (Clara). As with initial setup, the key may be sent via the primary channel, and the verifier is sent out-of-band, allowing recipients (Clara) to verify the authenticity of the key. Once verified, Clara may send her partial key back to Alice using the recovery key.

Once Alice has the required number of partial keys, she may reconstruct her RootKey—thereby regaining access to her secured material—and set a new password.

Conditional Release (or Retrieval) Scenarios

Conditional Release Scenarios are an advantageous feature of the encryption service feature that, similar to Password Reset, leverage Trusted Party relationships to help a user in times of need. For example, Conditional Release Scenarios may allow a user (the Subject) to specify that some of their data is to be released to certain Trusted Parties (the Receivers) when certain conditions are met. Generally, and most helpfully, these may be conditions under which the Subject is not themselves able to share the data, such as during a medical emergency or upon their death.

There may be four user roles involved in a Conditional Release Scenario:
 (1) The Subject is the controlling user who configures the Scenario and whose data is released.
 (2) The Claimant is able to submit a claim that the Scenario's conditions have been met (eg, "I claim that the Subject has been hospitalized and is in a medical emergency").
 (3) The Approver is able to confirm or deny the claim (eg, "I confirm that the Subject is in a medical emergency").
 (4) The Receiver will have the Subject's chosen data shared with them upon approval of the claim.

In general, there may be more than one of each of the Claimant, Approver and Receiver roles.

As with Password Reset, Conditional Release Scenarios may make use of secret-splitting to securely distribute encryption keys to Approvers such that only when some predetermined subset (or quorum) of them agree may the partial keys be combined by the Receivers to decrypt the related data.

Figure 10:
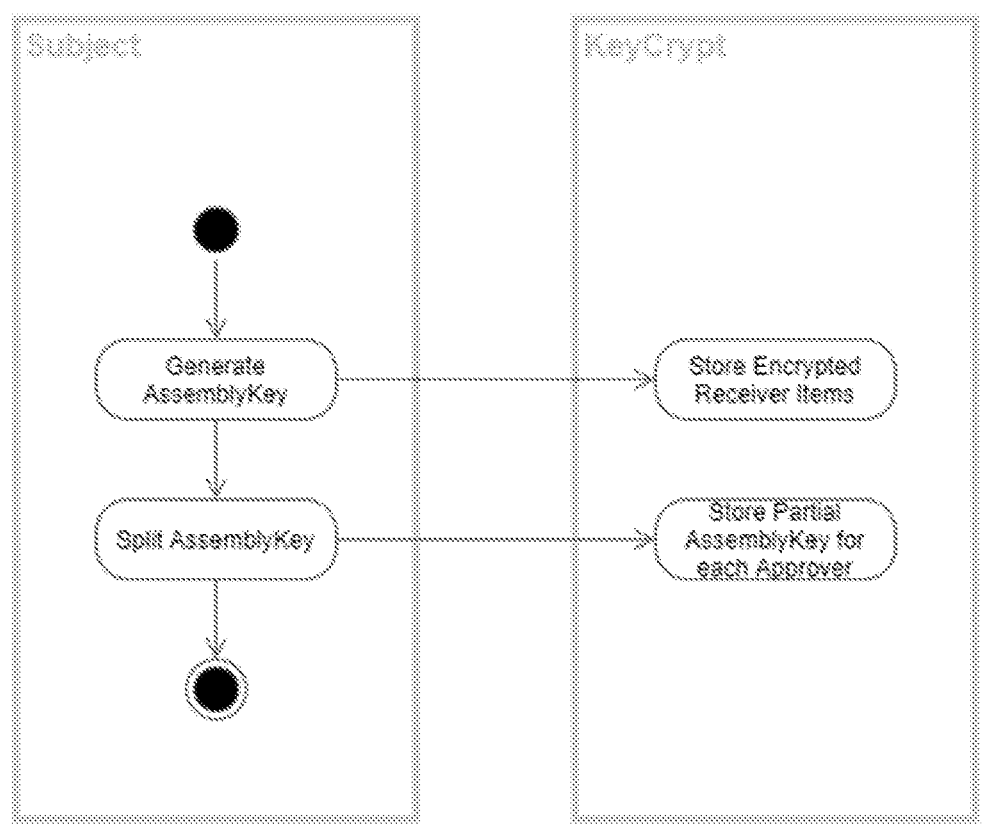
FIGS. 10 and 11 are schematic diagrams of conditional release processes of the method.

Referring to FIG. 10, to set up a Conditional Release Scenario, the Subject may generate a unique encryption key, the AssemblyKey. Items to be shared with Receivers may then be encrypted with this key. This key may then be split, with partial keys shared with each Approver.

Figure 11:
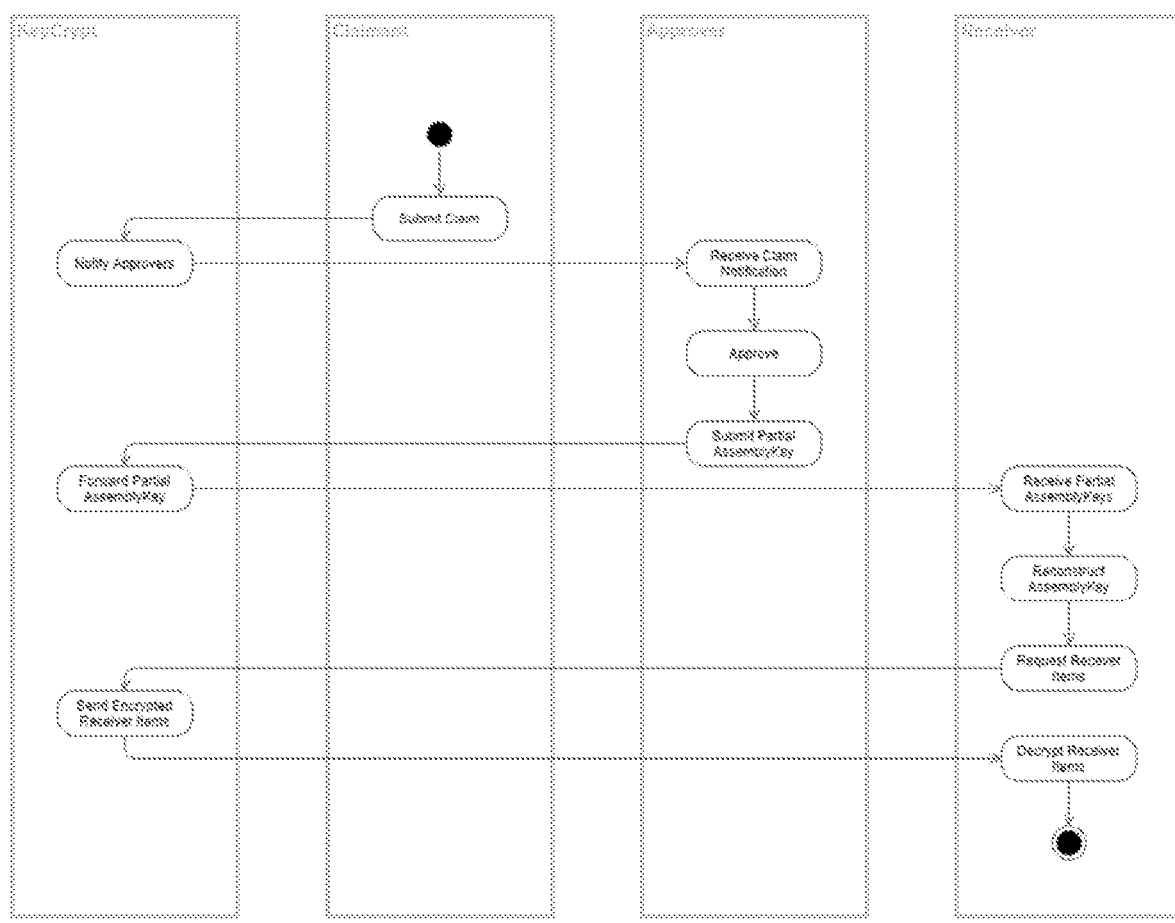

Referring to FIG. 11, to enact a Scenario, a Claimant may submit a Claim to the encryption service. The encryption service then notifies all Approvers. Each Approver may then approve or reject the claim, ideally after independently verifying its validity. Upon approving, the Approver's partial AssemblyKey is prepared for release to Receivers. If desired, the Subject may configure the Scenario such that rejection by a single Approver results in the Claim being terminated. Once the required number of approvals have been given (and hence the required number of AssemblyKey partials have been submitted), the AssemblyKey partials are forwarded to the Receivers, who may then reconstruct the AssemblyKey. Receivers may then request (or retrieve) and decrypt the items to be released.

Files and Directories

Figure 12:
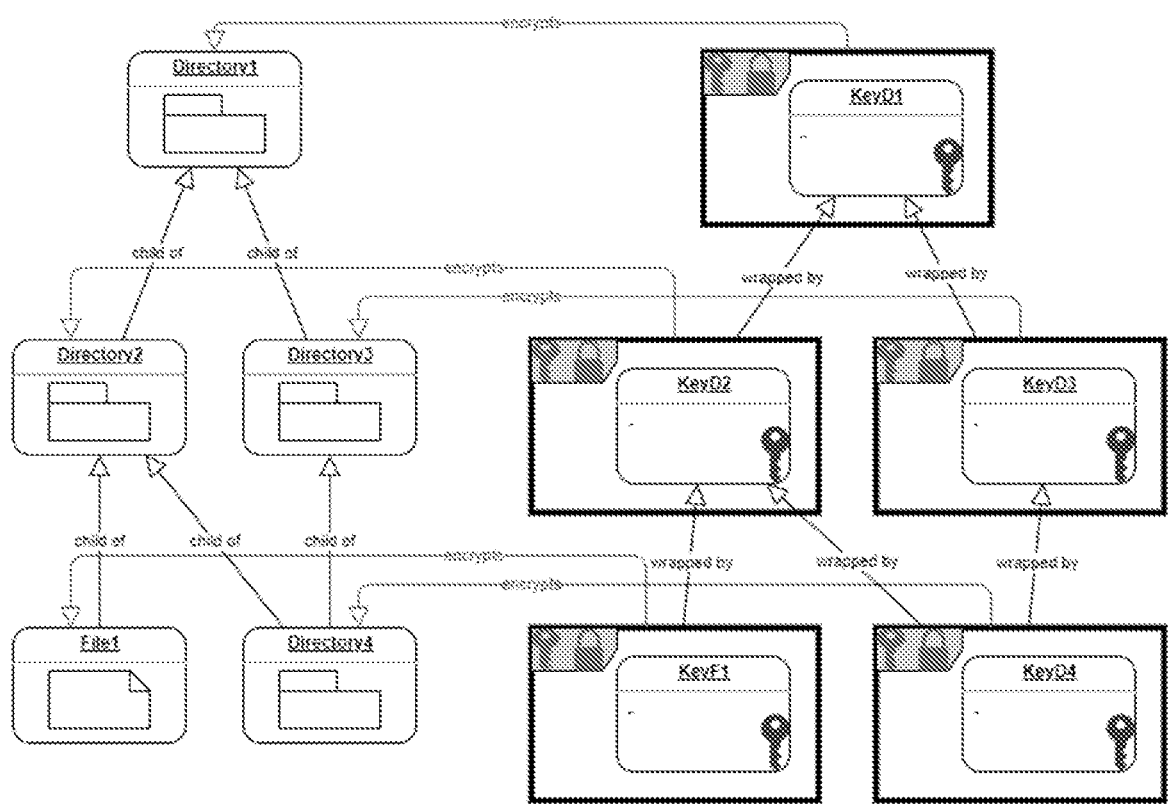
FIG. 12 is a schematic diagram of a file and directory structure of the method.

Referring to FIG. 12, the encryption service may organise User data in a hierarchical data structure, such as file storage structure provided by a file system that includes Files and Directories, in a similar fashion to how data is organised in most conventional computing environments. In general, Files and Directories may have one or more parent Directories.

Each item (File or Directory) may have an associated Key that is used to encrypt the secured content of the item. The item key may also be used to wrap the keys of all child items, such that the item hierarchy is mirrored in the key hierarchy.

This means that a given key may provide cryptographic access to the associated item and, indirectly, to all descendants by traversing down the key graph using cascading wrapped keying. This may make it possible to provide access to hierarchically related subsets via a single key. For example, cryptographic access to Directory2 and its two descendants File1 and Directory4 may be obtained via KeyD2, which indirectly provides access to KeyF1 and KeyD4.

In addition to cryptographic access control (ie, the requirement of access to appropriate keys), the encryption service may incorporate logical access control mechanisms. These controls may be specified independently per item and determine what operations a user may perform on the item, such as read, update or delete. It may also be possible to explicitly deny access via logical controls, even if the user is in possession of the associated key.

For a user to access a given item, they must satisfy both cryptographic and logical access control requirements, that is, they must have access to the correct key and must also have been granted logical access.

Cryptographic access control mechanisms may ensure the security of user data even in the event of the encryption service becoming compromised (the encryption service has no access to bare keys), and logical access control mechanisms may ensure the security of user data in the event of keys being leaked (simply possessing a key will not allow access to the data).

Embodiments of the present invention provide a system and method that are both generally and specifically useful for secure cloud storage and retrieval of client-side encrypted data.

Embodiments of invention advantageously provide client-side encryption within a robust security architecture. Conventional client-side encryption creates unavoidable usability problems which causes an unwillingness to adopt the technology for most data controllers which embodiments of the invention aim to overcome. Embodiments of the invention incorporate various processes with the goal of developing a client-side encryption model within a user-friendly package. One focus of embodiments is on establishing zero knowledge encryption for the data controller to ensure user data is never exposed to the service provider and that the user has complete ownership of the data stored. One of the problems addressed by embodiments of the invention is account recovery which is overcome with key splitting to provide complete recovery in the event of a forgotten password, death of a user or other incapacitation by relying on a trusted intermediary to act as the verifier of the user. This entire system has also been designed to run only within the web browser leveraging functionality that is available through web-based interaction. This removed many options that are available when developing an encryption interface that can be packaged within a software download and run using the device operation system and resources. A browser-based package provides the widest compatibility as it can be supported on any device, without requiring any storage space being allocated and without minimum hardware requirements beyond those required to run a web browser.

The combination of zero knowledge client-side encryption and key splitting within a browser-based package ensures embodiments of the invention provide end users with complete privacy from the data controller and storage while also having a platform that offers many of the standard expected features of a web application such as account recovery.

Embodiments of the invention make complete client-side encryption a core feature of the system in order to guarantee that a service provider has no option to decrypt a user's data without the user providing access. Embodiments differ from existing popular client-side platforms via the features of providing persistent, longer-term storage of sensitive data and partial key distribution for conditional release and recovery of data.

In the client-side encryption model of embodiments of the invention, a unique encryption key is generated for every user that inherently incorporates the user's password. For every user this encryption key is completely unique, even if they choose the same password. This may be achieved via cryptographic salts that are generated randomly for each user. It can only be reconstructed with access to the user's individual password, and can only be used to access their own data. The user holds onto this key which means the controller never has access to the key and any data stored is useless without it. Client-side encryption means that if the controller decides to sell or access the user's data, they cannot do so without the user's password and key, protecting all data that is being stored on their behalf. If an employee of the controller acts in bad faith or a system is breached, each individual user is individually encrypted and it is impractical to try to decrypt this data without a key. This feature makes client-side encryption a superior model for protecting the privacy and security of users. The largest reason client-side encryption has not seen wider adoption is due to challenges with useability. If a user forgets their password or loses their key, the company cannot help recover the data as the user is the only one holding the key. For some products, services or security implementations, this is a positive but the lack of useability makes client-side encryption unpopular with many companies.

Embodiments of the present invention offer features that provide a unique intersection of privacy, security and convenience. These features may be summarised as follows:

1. Multi layered data security model that is realised via independent subsystems: authentication, access control, and encryption.
2. A key management system that contains a graph of encrypted symmetric keys (wrapped keys) and signed asymmetric keys. Accessing keys from the graph requires access to the root keys, which are only reconstructible from the user's password.
3. A file directory cloud storage system whose content and meta data are encrypted client-side using keys from the key graph.
4. A key exchange system that allows users to exchange encryption keys in order to share client-side encrypted data. The system has a number of different modes of operation with varying trade-offs between security and convenience. It also includes signing of asymmetric keys that form a chain that supports transitive trusted relationships.

5. Files and entire directories can be shared between users when given permission by the owner of the files and directories.
6. File content and metadata of files and directories are signed using asymmetric keys to provide proof of authorship.
7. A high entropy passphrase-based password reset and account recovery system
8. A distributed partial-key based password reset and account recovery system in which partial-keys are distributed to a collection of user designated parties. Once a user specified quorum of parties form a consensus, their partial keys are combined to recover the key needed for account recovery.
9. A distributed partial-key based conditional data release system, in which data is released once certain conditions have been met and that a quorum of trusted parties agree to release the data.
10. Leverages third party identity providers to reduce the risk of compromised authentication systems yet without exposing the user password to the third-party provider.
11. Organisation that are composed of a number of users with different access levels. Access to files and directories can be granted from the owner to an organization. Members of the organisation are granted corresponding levels of access.
12. Implementation of the above within a cross platform browser environment.
13. A search and indexing process that functions on data that has been encrypted using the encryption service that operates within the limitations of a web browser without requiring unencrypted user data being sent to a server for processing.
14. Fine grained key rotation either on a regular basis as per security recommendations or in response to threats.
15. Use of quantum resistant cryptographic algorithms (such as symmetric encryption algorithms) where possible, especially for long term data storage.

Embodiments of the invention address the problems faced by traditional encryption methods by implementing a client-side encryption model with key splitting. Client-side encryption offers complete privacy for users of a service ensuring the data is encrypted at every point the data controller has access. Not only does this guarantee that sensitive data cannot be accessed by the service provider it also provides protection against the most common forms of cyberattack.

The architecture of embodiments of the invention combine a client-side encryption implementation with a key splitting model that allows users to get all the benefits of client-side encryption without sacrificing the recoverability of data. By allowing users to split parts of their key to other trusted intermediaries users can designate a quorum of trusted intermediaries such as their spouse, children, business associates, professional advisors, independent identity validation services or any other entity that can verify that the user has the right to access the account. This allows users to have complete ownership of their data and ensure the controller of the service is unable to sell or leverage that data without explicit permission while also allowing users to be able to recover their data in the event they forget their password.

One example of a technical application for the encryption model of embodiments of the invention is a life administration vault that allows users to store critical files including wills, agreements, certifications or documents with complete privacy from the company providing the service. These files will always be on hand to the user and accessible through a cloud-based platform providing convenient access to the data. This information can then be shared with trusted third parties such as professional advisors, family, and friends to provide recovery of the account in the event the user forgets their password. The user can also designate files that can be accessed by these third parties and provide rules for that access. These rules can also include data access being provided in the event the user passes away or is medically incapacitated. This will drastically reduce the burden during end-of-life administration that is put onto the family or executor. Simple things like locating a life insurance policy or cancelling direct debits and subscriptions can take professional executors weeks or months, but with embodiments of the invention this can be done by the family in minutes.

Embodiments of the invention provide a model that can be used to provide private and secure data protection to other industries and leverage a central trusted body to provide independent verification of identity in the event a user forgets their password. This model may guarantee users with complete privacy from the controllers of data within digital services, products and platforms and give users a choice on who is leveraging or viewing their personal data.

Embodiments of the invention may have additional applications as follows:
as an encryption key management provider that plugs into other services, such as Google Drive, Gmail, etc;
as a hierarchical data storage system or file storage system;
to provide key exchange between trusted parties, with extra security provided via low or high bandwidth out-of-band channels; and
to provide web-of-trust style identity verification system using the trusted parties infrastructure.

For the purpose of this specification, the word "comprising" means "including but not limited to," and the word "comprises" has a corresponding meaning.

The above embodiments have been described by way of example only and modifications are possible within the scope of the claims that follow.

The invention claimed is:
1. A system, comprising:
a memory; and
a processor configured by instructions stored in the memory to:
receive a password from a user;
derive an encryption root key and user identity information from the password;
authenticate the user by an identity provider service using the password-derived user identity information;
client-side encrypt data of the authenticated user using a hierarchical encryption structure derived from the password-derived encryption root key;
store the client-side encrypted data on cloud storage using a hierarchical storage structure;
establish trusted party relationships between the user and trusted parties using out-of-band encryption key exchange;
split an encryption key into partial encryption keys;
distribute the partial encryption keys between the trusted parties;
assemble the partial encryption keys from the trusted parties to allow one or more of:
the trusted parties to retrieve and decrypt the client-side encrypted data;
the user to reset the password;

the user or the trusted parties to perform hierarchical key management of one or more of the encryption root key, the encryption key, and the partial encryption keys;

wherein the encryption root key is derived from an intermediate root key which is derived from the password within a short time after receiving the password to minimise the time required for storage of the password in memory.

2. The system of claim 1, wherein the hierarchical encryption structure of the client-side encrypted data mirrors or maps to the hierarchical storage structure of the client-side encrypted data.

3. The system of claim 2, wherein the hierarchical encryption structure comprises a key graph, and the hierarchical storage structure comprises a file storage structure.

4. The system of claim 3, wherein the key graph comprises a tree having a single root encryption key derived from the password-derived encryption root key, and each path in the tree comprises a hierarchy of wrapped encryption keys derived from the single root encryption key.

5. The system of claim 4, wherein the client-side encrypted data is stored in a hierarchy of data objects, and wherein the hierarchy of wrapped encryption keys mirrors or maps to the hierarchy of data objects in which the client-side encrypted data is stored.

6. The system of claim 1, wherein the hierarchical key management of one or more of the encryption root key, the encryption key, and the partial encryption keys comprises one or more of key generation, key recovery, key reset, key rotation, key exchange, key distribution, key allocation, and key delegation within an organisation.

7. The system of claim 6, wherein the hierarchy of wrapped encryption keys enables hierarchical delegation of encryption keys within an organisation having a hierarchical structure, whereby a superior trusted party within the organisation may generate a hierarchical encryption key of a lower-level recipient within the organisation to thereby allow hierarchical access by the lower-level recipient to the client-side encrypted data.

8. The system of claim 1, wherein a predetermined condition for retrieval and decryption of the client-side encrypted files is specified by the user, and the trusted parties comprise a subset of:
   a claimant to claim that the condition has been satisfied;
   an approver to approve or deny the claim; and
   a receiver to retrieve and decrypt the client-side encrypted files if the claim is approved.

9. A method, comprising:
receiving a password from a user;
deriving an encryption root key and user identity information from the password;
authenticating the user by an identity provider service using the password-derived user identity information;
client-side encrypting files of the authenticated user using a hierarchical encryption structure derived from the password-derived encryption root key;
storing the client-side encrypted files on cloud storage using a hierarchical storage structure;
establishing trusted party relationships between the user and trusted parties using out-of-band encryption key exchange;
splitting an encryption key into partial encryption keys;
distributing the partial encryption keys between the trusted parties;
assembling the partial encryption keys from the trusted parties to allow one or more of:
the trusted parties to retrieve and decrypt the client-side encrypted data;
the user to reset the password;
the user or the trusted parties to perform hierarchical key management of one or more of the encryption root key, the encryption key, and the partial encryption keys,
wherein the c root key is derived from an intermediate root key which is derived from the password within a short time after receiving the password to minimise the time required for storage of the password in memory.

10. A non-transitory machine-readable medium having stored thereon machine-readable instructions executable to cause a machine to perform operations comprising:
receiving a password from a user;
deriving an encryption root key and user identity information from the password;
authenticating the user by an identity provider service using the password-derived user identity information;
client-side encrypting files of the authenticated user using a hierarchical encryption structure derived from the password-derived encryption root key;
storing the client-side encrypted files on cloud storage using a hierarchical storage structure;
establishing trusted party relationships between the user and trusted parties using out-of-band encryption key exchange;
splitting an encryption key into partial encryption keys;
distributing the partial encryption keys between the trusted parties;
assembling the partial encryption keys from the trusted parties to allow one or more of:
the trusted parties to retrieve and decrypt the client-side encrypted files;
the user to reset the password;
the user or the trusted parties to perform hierarchical key management of one or more of the encryption root key, the encryption key, and the partial encryption keys,
wherein the encryption root key is derived from an intermediate root key which is derived from the password within a short time after receiving the password to minimise the time required for storage of the password in memory.

\* \* \* \* \*